(12) United States Patent
Woodall (10) Patent No.: US 7,391,472 B1
(45) Date of Patent: Jun. 24, 2008

(54) SYSTEM AND METHOD FOR ADAPTIVE COLOR BURST PHASE CORRECTION

(75) Inventor: Neil D. Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 698 days.

(21) Appl. No.: 11/031,124

(22) Filed: Jan. 5, 2005

Related U.S. Application Data (63) Continuation-in-part of application No. 10/833,979, filed on Apr. 27, 2004, now Pat. No. 7,304,688.

(60) Provisional application No. 60/472,280, filed on May 20, 2003.

(51) Int. Cl.
*H04N 9/89* (2006.01)
*H04N 9/45* (2006.01)
*H04L 7/00* (2006.01)

(52) U.S. Cl. .................... 348/498; 348/505; 348/520; 348/539; 386/17

(58) Field of Classification Search ......... 348/505–508, 348/194, 539, 549, 520, 497–499; 386/10, 386/17, 19
See application file for complete search history.

(56) References Cited

U.S. PATENT DOCUMENTS

| | | | |
|---|---|---|---|
| 3,860,952 A | | 1/1975 | Tallent et al. |
| 3,946,432 A | * | 3/1976 | Goldberg et al. ............ 348/539 |
| 4,053,926 A | * | 10/1977 | Lemoine et al. ............... 386/14 |
| 4,196,445 A | | 4/1980 | Okada et al. |
| 4,443,821 A | | 4/1984 | Kato |
| 4,520,402 A | * | 5/1985 | Hurst, Jr. .................... 386/17 |
| 4,590,510 A | * | 5/1986 | Jensen .......................... 348/499 |
| 4,641,180 A | | 2/1987 | Richter |
| 4,675,724 A | | 6/1987 | Wagner |
| 4,780,770 A | * | 10/1988 | Wagner ......................... 386/90 |
| 4,855,815 A | | 8/1989 | Yasuki et al. |
| 4,989,073 A | * | 1/1991 | Wagner ........................ 348/498 |
| 5,097,321 A | | 3/1992 | Stern et al. |
| 5,121,203 A | | 6/1992 | Citta |
| 5,121,207 A | | 6/1992 | Herrmann |
| 5,134,467 A | | 7/1992 | Kim |
| 5,142,377 A | | 8/1992 | Moriyama et al. |

(Continued)

FOREIGN PATENT DOCUMENTS

| | | |
|---|---|---|
| EP | 0449501 | 10/1991 |
| EP | 0549375 | 6/1993 |

*Primary Examiner*—Victor R Kostak
(74) *Attorney, Agent, or Firm*—Marger, Johnson & McCollom, P.C.

(57) ABSTRACT

We describe and claim an adaptive color burst phase correction system and method. The adaptive color burst phase correction system includes a signal detector to extract a color burst from a video signal, the color burst including a phase and an amplitude, an adaptive phase corrector to adjust the color burst phase responsive to corruption in the color burst, a Y/C separator to separate luminance and chrominance data from the video signal, responsive to the adjusted color burst phase, and a panel to display the luminance and chrominance data. The adaptive phase corrector includes a corruption detector to detect corruption in a color burst, a selector to select a phase correction value responsive to the detected corruption, and a phase adjuster to adjust a color burst phase responsive to the phase correction value.

44 Claims, 6 Drawing Sheets

U.S. PATENT DOCUMENTS

| | | |
|---|---|---|
| 5,231,478 A | 7/1993 | Fairhurst |
| 5,260,839 A | 11/1993 | Matsuta et al. |
| 5,345,276 A | 9/1994 | Hong |
| 5,351,089 A * | 9/1994 | Matsumoto et al. ......... 348/497 |
| 5,355,176 A | 10/1994 | Inagaki et al. |
| 5,359,366 A | 10/1994 | Ubukata et al. |
| 5,367,338 A | 11/1994 | Rothermel et al. |
| 5,394,193 A | 2/1995 | Kim |
| 5,404,230 A * | 4/1995 | Hong ............................ 386/9 |
| 5,418,818 A | 5/1995 | Marchetto et al. |
| 5,463,475 A * | 10/1995 | Nishikawa et al. ............ 386/19 |
| 5,475,440 A * | 12/1995 | Kobayashi et al. .......... 348/498 |
| 5,506,932 A | 4/1996 | Holmes et al. |
| 5,523,798 A * | 6/1996 | Hagino et al. ............... 348/665 |
| 5,525,984 A | 6/1996 | Bunker |
| 5,526,129 A | 6/1996 | Ko |
| 5,600,379 A | 2/1997 | Wagner |
| 5,621,537 A * | 4/1997 | Shibue et al. ................. 386/17 |
| 5,686,972 A | 11/1997 | Kim |
| 5,710,729 A | 1/1998 | Feste et al. |
| 5,748,842 A | 5/1998 | Holmes et al. |
| 5,909,255 A | 6/1999 | Hatano |
| 5,940,138 A | 8/1999 | Lowe |
| 5,953,071 A | 9/1999 | Van Zon |
| 5,963,268 A | 10/1999 | Ko |
| 5,990,978 A | 11/1999 | Kim et al. |
| 6,052,748 A | 4/2000 | Suominen et al. |
| 6,173,003 B1 | 1/2001 | Whikehart et al. |
| 6,175,389 B1 | 1/2001 | Felts, III et al. |
| 6,208,671 B1 | 3/2001 | Paulos et al. |
| 6,297,849 B1 | 10/2001 | Stessen et al. |
| 6,300,985 B1 | 10/2001 | Lowe |
| 6,462,790 B1 | 10/2002 | Lowe et al. |
| 6,581,164 B1 | 6/2003 | Felts, III et al. |
| 6,614,474 B1 | 9/2003 | Malkin et al. |
| 6,714,717 B1 | 3/2004 | Lowe et al. |
| 6,744,472 B1 | 6/2004 | Macinnis et al. |
| 6,774,954 B1 | 8/2004 | Lee |
| 6,795,001 B2 | 9/2004 | Roza |
| 6,795,126 B1 | 9/2004 | Lee |
| 6,804,697 B2 | 10/2004 | Bugeja et al. |
| 6,956,620 B2 | 10/2005 | Na |
| 7,102,692 B1 | 9/2006 | Carisgaard et al. |
| 7,298,418 B2 * | 11/2007 | Delanghe et al. ............ 348/520 |

* cited by examiner

SYSTEM AND METHOD FOR ADAPTIVE COLOR BURST PHASE CORRECTION

This application is a continuation in part and claims priority from U.S. patent application Ser. No. 10/833,979, filed Apr. 27, 2004 now U.S. Pat. No. 7,304,688, which claims priority from U.S. Provisional Application No. 60/472,280, filed May 20, 2003, which we incorporate here by reference.

FIELD OF THE INVENTION

This invention relates to image processing and, more specifically, to a system and method for adaptive filtering of color burst phase information.

BACKGROUND OF THE INVENTION

Composite video signals, commonly used in video broadcasts or transmissions, contain a brightness signal (luminance, luma or Y) and a color signal (chrominance, chroma or C), where the color signal is modulated into a color sub-carrier and added to the brightness signal prior to transmission. To effectuate demodulation of the color sub-carrier upon reception, the composite video signal provides a color burst during each horizontal blanking period, where each color burst is several cycles of the unmodulated color sub-carrier comprising frequency, amplitude, and phase reference information.

Since color picture quality depends upon the color burst, any corruption in the color burst can cause undesirable results when the video signal is displayed. Traditional methods of detecting the color burst corruption heavily rely on the overall amplitude of the color burst. The situation exists, however, where the color burst is within a predetermined amplitude range, but the color burst phase is corrupted. Thus the traditional methods allow the corrupted color burst to go undetected, and the color picture quality deteriorates as a result.

Accordingly, a need remains for a system and method for adaptive filtering of color burst phase information that results in an improved color picture produced under all signal conditions.

BRIEF DESCRIPTION OF THE DRAWINGS

The foregoing and other objects, features, and advantages of the invention will become more readily apparent from the following detailed description of a preferred embodiment that proceeds with reference to the following drawings.

DESCRIPTION OF THE INVENTION

Figure 1:
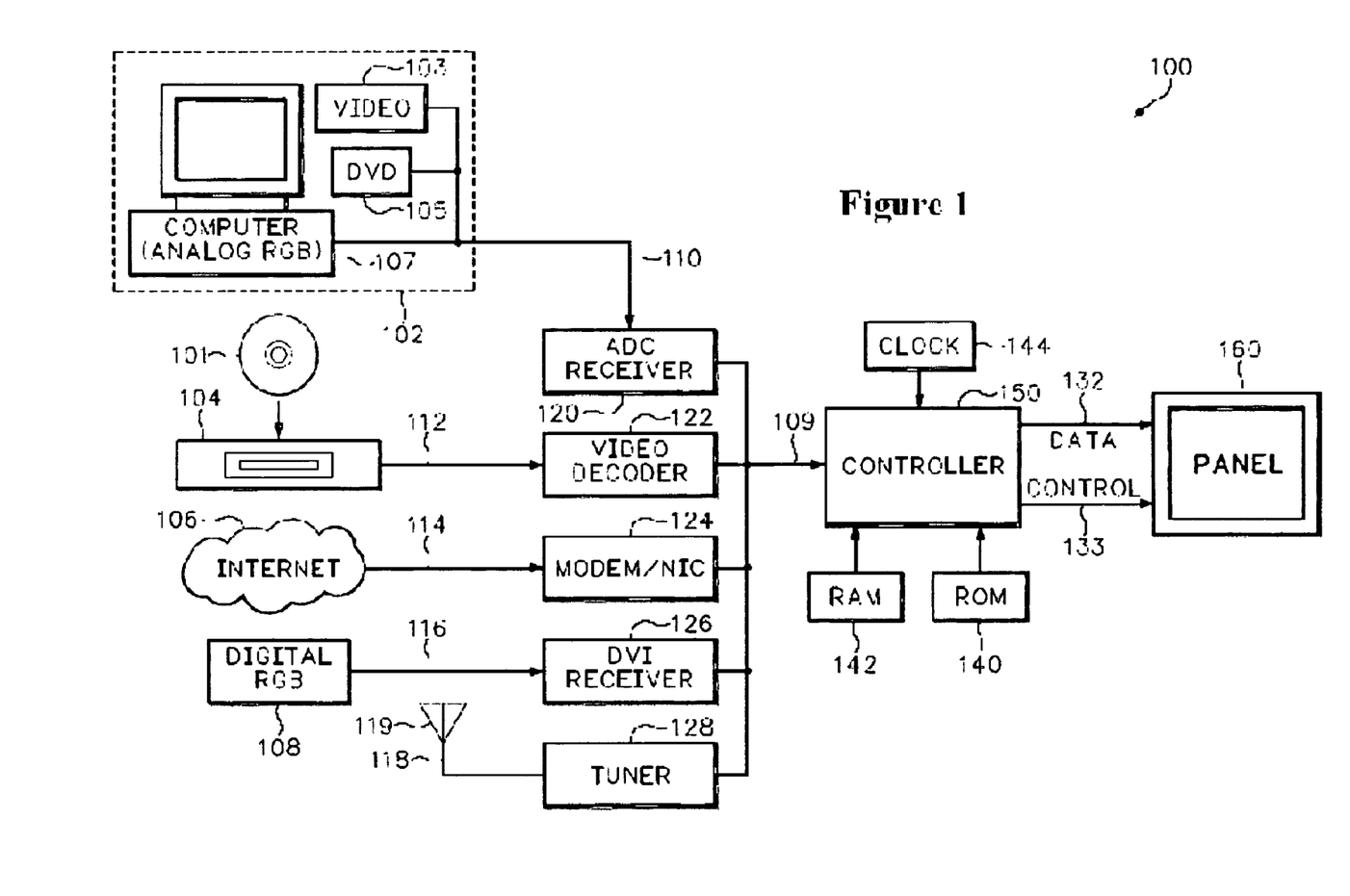
FIG. 1 is a block diagram of a display system.

FIG. 1 is a block diagram of display system 100. Referring to FIG. 1, the system 100 includes a receiver 120 for receiving an analog image data signal 110, e.g., RGB or YPBPR signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the panel controller 150. The decoder 122 is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signal 109 to the panel controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the panel controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signal 109 may be a stream of digital numbers describing a continuous analog video waveform in either composite or component form. FIG. 1 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The panel controller 150 provides the image data 132 and control signals 133 to a panel device 160. The panel 160 may include a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. The panel 160 may alternatively be a cathode ray tube display or other like technology. A person of reasonable skill in the art should recognize that panel 160 may be a television, monitor, projector, personal digital assistant, and other like applications.

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion are not central to this invention and are not discussed in further detail.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 2:
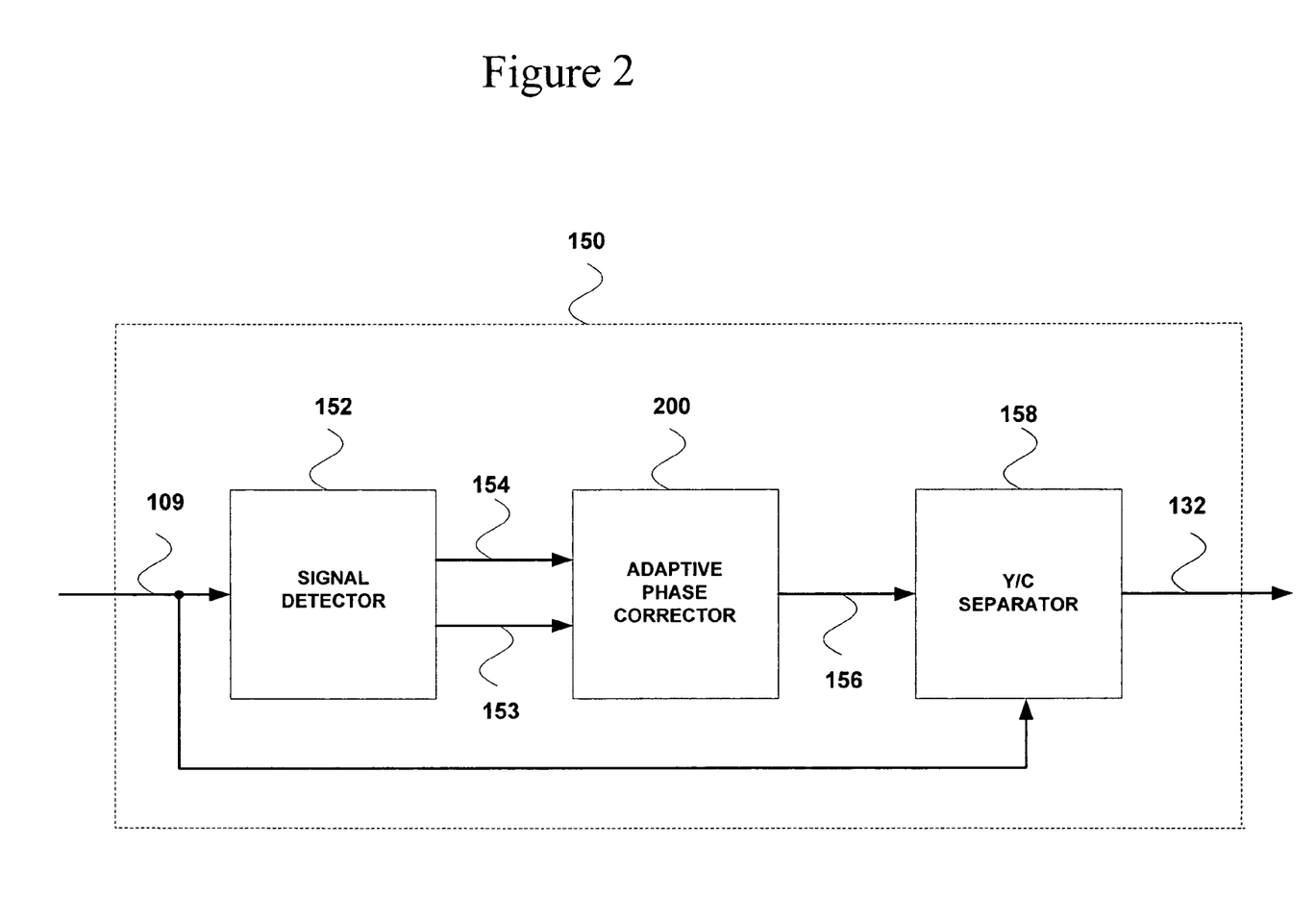
FIG. 2 is a block diagram of an embodiment of the controller shown in FIG. 1.

FIG. 2 is a block diagram of an embodiment of the controller 150 shown in FIG. 1. Referring to FIG. 2, the controller 150 includes a signal detector 152 for detecting color bursts in digital video signal 109 and providing color burst information 154 to an adaptive phase corrector 200. The signal detector 152 may extract the color burst information 154 from the digital video signal 109. Color burst information 154 may be color burst measurements, e.g., the amplitude and the phase of each color burst, or may be color burst error measurements, e.g., the amplitude and the phase of each color burst compared with respect to expected color burst information. The expected color burst information may be the color burst information 154 used to demodulate a previous line, or predetermined values, e.g., an expected phase of 0 degrees.

Signal detector 152 may measure the transmission noise of digital video signal 109, e.g., random noise, white noise, or the like, and provide a noise measurement 153 to the adaptive phase corrector 200. The signal detector 152 may detect noise by finding a root mean square (RMS) value of the signal 109. The signal detector 152 may detect the RMS value after the signal 109 is filtered to remove the color subcarrier, e.g., using a bandstop filter. The signal detector 152 may calculate the RMS value over several pixels, e.g., 32. The signal detector 152 then calculates the minimum (or other predetermined value or threshold) RMS value over the line as the noise estimate. One advantage of RMS noise calculation is that the system does not require reliable synchronization signal detection to determine noise allowing adjustment to the synchronization detection process without creating a positive feedback loop. A person of reasonable skill in the art knows well other possible designs for the signal detector 152.

The adaptive phase corrector 200 generates an adjusted color burst phase 156 by manipulating the color burst information 154. The adaptive phase corrector 200 may manipulate the color burst information 154 responsive to the noise measurement 153. The adaptive phase corrector 200 may be integrated into a monolithic integrated circuit or hardwired using any number of discrete logic and other components. Alternatively, the controller 150 may be a dedicated processor system that includes a microcontroller or a microprocessor to implement the adaptive phase corrector 200 as a software program or algorithm. The adaptive phase corrector 200 provides the adjusted color burst phase 156 to a Y/C separator 158. The Y/C separator 158 may include various combinations of two-dimensional and/or three dimensional comb filters, or the like, capable of generating the image data 132 by manipulating a digital video signal 109 responsive to the adjusted color burst phase 156. The image data 132 may be manipulated further by downstream circuitry in the controller 150 before being provided to the panel 160 as we explain above. The image data 132 may, for example, be scaled by a downstream scaler circuit before being provided to the panel 160 for display. A person of reasonable skill in the art knows well the design and operation of the Y/C separator 158.

Figure 3:
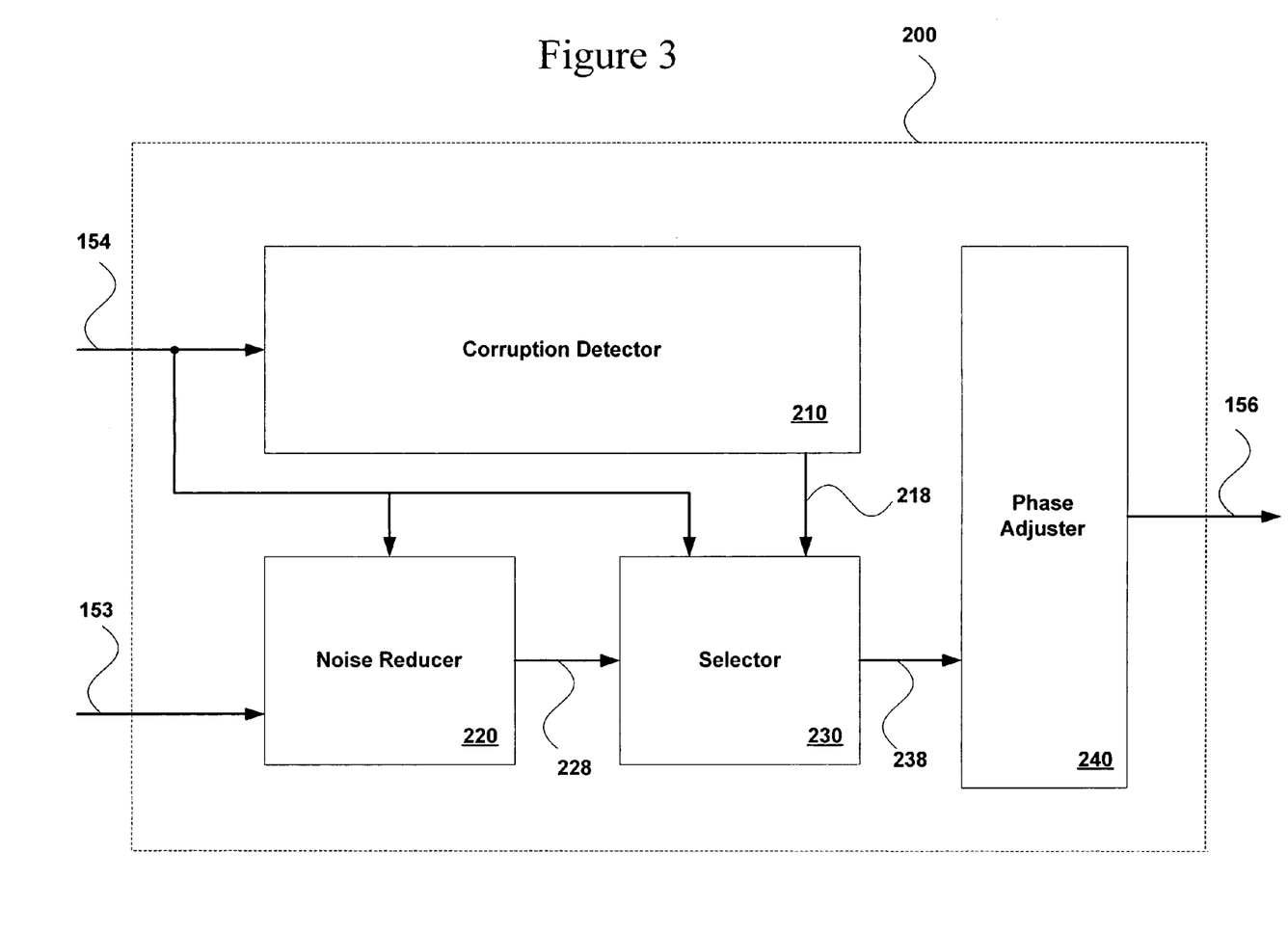
FIG. 3 is a block diagram of an embodiment of the adaptive phase corrector shown in FIG. 2.

An embodiment of the adaptive phase corrector 200 will be explained with reference to FIGS. 3-7. FIG. 3 is a block diagram of an embodiment of the adaptive phase corrector 200 shown in FIG. 2. Referring to FIG. 3, the adaptive phase corrector 200 includes a corruption detector 210 to detect corruption in the color burst information 154. The corruption detector 210 provides selection signals 218 to a selector 230 responsive to the detection. When the color burst information 154 is provided as color burst measurements, corruption detector 210 may generate the color burst error measurements from the color burst information 154 and expected color burst information. The corruption detector 210 may provide the color burst error measurements to a noise reducer 220 and the selector 230 as the color burst information 154.

The noise reducer 220 generates a reduced color burst phase error or correction value 228 responsive to the color burst information 154 and the noise measurement 153. The noise reducer 220 may generate a reduced color burst phase error 228 by reducing the color burst information 154 with at least one coefficient, where the coefficients may be determined responsive to the color burst information 154 and/or the noise measurement 153. The noise reducer 220 provides the reduced color burst phase error 228 to the selector 230.

The selector 230 provides a phase correction value 238 to a phase adjuster 240 responsive to the selection signals 218. The phase corrective value 238 may be the phase correction value of the color burst information 154, the reduced color burst phase error 228, or the expected phase for that line, e.g., a null value. The phase corrective value 238 may be any other value determined from the color burst signal in the video signal 109. The null value may indicate that adaptive phase corrector 200 ignores the color burst detected by signal detector 152. Selector 230 may generate the null value. The phase adjuster 240 generates the adjusted color burst phase 156 responsive to the phase corrective value 238. The corruption detector 210, the noise reducer 220, the selector 230, and the phase adjuster 240 may be implemented in an integrated circuit or a portion thereof, a hardwired module using any number of discrete logic and other components, a software program or algorithm, or the like, or any combination thereof.

Figure 4:
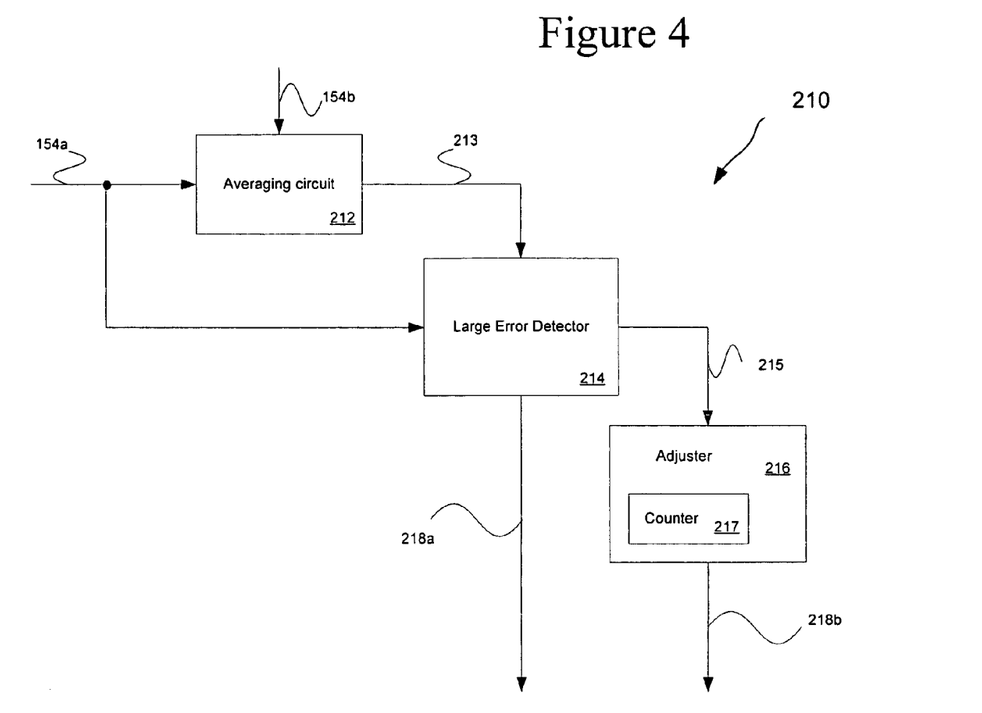
FIG. 4 is a block diagram of an embodiment of the corruption detector shown in FIG. 3.

FIG. 4 is a block diagram of an embodiment of the corruption detector 210 shown in FIG. 3. Referring to FIG. 4, the corruption detector 210 includes an averaging circuit 212 to generate an average of the absolute value of the phase error 213 responsive to a phase portion 154a of the color burst information 154. The phase portion 154a may be a phase error measurement or any other portion of the color burst signal 154. The average phase 213 may be an average phase error corresponding to an expected phase measurement. The average phase 213 may be the average of the current phase portion 154a and any number of phase portions 154a corresponding to previously received color burst information signals 154. The averaging circuit 212 may average the color burst phase portion 154a responsive to an amplitude portion 154b of the color burst information 154. The averaging circuit 212 may average the color burst phase portion 154a (or any other portion of the color burst signal 154) using any manner of well known techniques. The averaging circuit 212 provides the average phase 213 to a large error detector 214.

The large error detector 214 generates a control signal 215 and a selection signal 218a responsive to the average phase 213 and the phase portion 154a. The control signal 215 may indicate to an adjuster 216 whether the phase portion 154a is corrupted. The selector 230 may select the phase correction value 238 responsive to the selection signal 218a, where the selection signal 218a may indicate to selector 230 that the phase portion 154a is corrupted. The large error detector 214 may determine the phase portion 154a is corrupted by comparing the phase portion 154a with the average phase 213. In an embodiment, phase portion 154a is deemed corrupted when it is four times the average phase 213.

The adjuster 216 generates a selection signal 218b responsive to the control signal 215. The selection signal 218b is provided to the selector 230, where the selector 230 may select the phase correction value 238 responsive to the selection signal 218b. The adjuster 216 may include a counter 217 to maintain a value, where the counter 217 increments and decrements a count responsive to the control signal 215. The counter 217 may increment the count responsive to a control signal 215 indicating the phase portion 154a is corrupted, and may decrement the count responsive to a control signal 215 indicating the phase portion 154a is not corrupted. In an embodiment, the count has a maximum value MAX and a minimum value MIN, where control signals 215 increment and decrement the count within the MAX and MIN values. To advert potential hue errors caused by, e.g., MacroVision color stripes and the selection of a null value by selector 230 responsive to selection signal 218a, the MAX value may be 4 and the MIN value may be 0. The MAX and MIN values may be any value and may be programmable by a user.

The adjuster 216 may generate the selection signal 218b responsive to the control signal 215 and the count in counter 217. In an embodiment, the adjuster 216 sets selection signal 218b to a high level when a control signal 215 indicating phase portion 154a is corrupted and the count is a MAX value, and sets selection signal 218b to a low level when a control signal 215 indicating phase portion 154a is not corrupted and the count is a MIN value.

Figure 5:
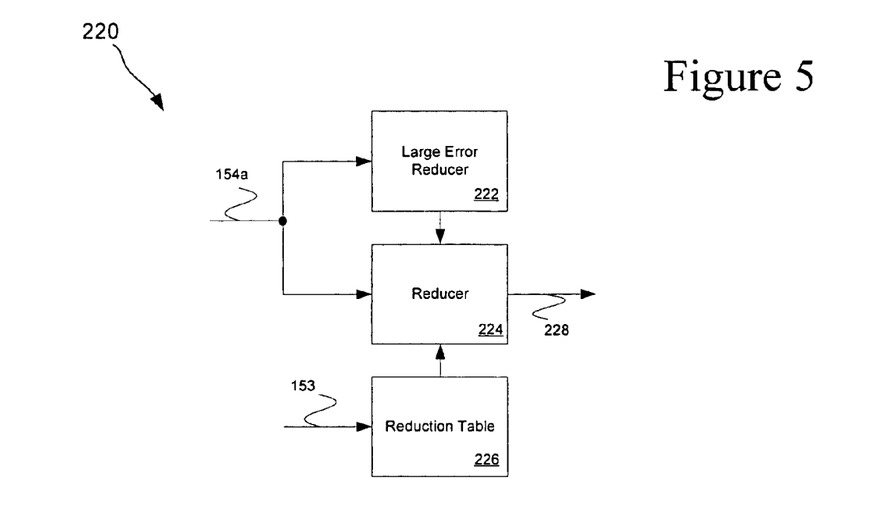
FIG. 5 is a block diagram of an embodiment of the noise reducer shown in FIG. 3.

FIG. 5 is a block diagram of an embodiment of the noise reducer 220 shown in FIG. 3. Referring to FIG. 5, the noise reducer 220 includes a reduction table 226 populated with at least one reduction coefficient indexable by the noise measurement 153. The reduction table 226 provides the reduction coefficient to a reducer 224 responsive to the noise measurement 153. Each reduction coefficient may be a number less than 1 indexable according to magnitude of the noise measurement 153, e.g., the smaller the noise measurement 153 the larger the corresponding reduction coefficient. In general the higher the noise 153, the more the phase error is reduced using smaller coefficients to multiply the phase error. Also, if the phase error is very large (e.g., >90 degrees), then the phase error is reduced even more by using even smaller coefficients.

The reduction table 226 may determine the reduction coefficient responsive to the noise measurement 153. The reduction table 226 may be populated in any of a variety of manners at any of a variety of times before and after the system's fabrication.

A large error reducer 222 determines a large error coefficient responsive to the phase portion 154a. The large error reducer 222 provides the large error coefficient to a reducer 224 responsive to the phase portion 154a. Each large error coefficient may reduce large errors corresponding to phase portion 154a. In an embodiment, the large error coefficient may be 1 when the error corresponding to the phase portion 154a is less than 90 degrees, or 0.5 otherwise. The large error coefficient may have any value that indicates error.

The reducer 224 generates the reduced color burst phase error 228 responsive to the phase portion 154a. The reducer 224 may operate additionally responsive to the large error coefficient provided by the large error reducer 222. And the reducer 224 may operate additionally responsive to the reduction coefficient provided by the reduction table 226. The reduced color burst phase error 228 may be the phase portion 154a reduced with the reduction coefficient and the large error coefficient, e.g., multiplying phase portion 154a with either or both the large error and reduction coefficients. The reducer 224 provides the reduced color burst phase error 228 to the selector 230. The reducer 224 provides the reduced color burst phase error 228 to the selector 230.

Figure 6:
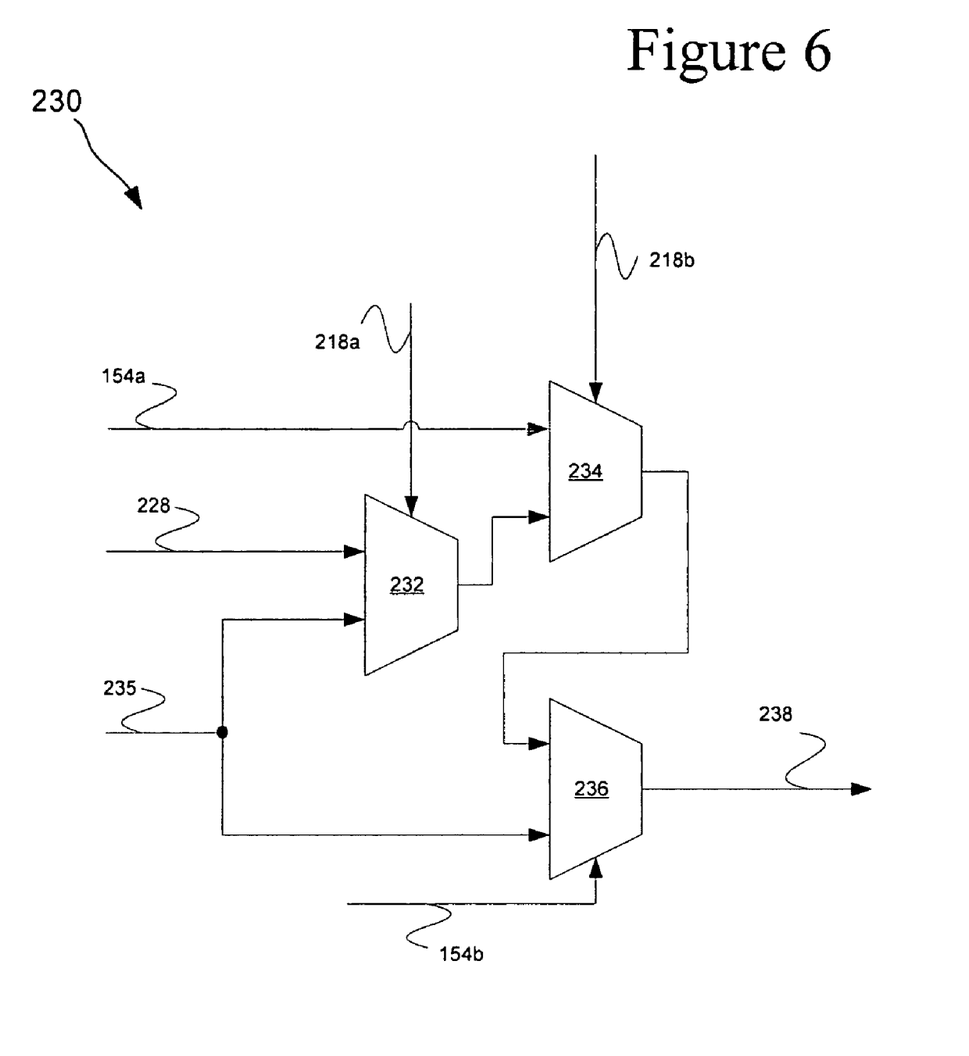
FIG. 6 is a block diagram of an embodiment of the selector shown in FIG. 3.

FIG. 6 is a block diagram of an embodiment of the selector 230 shown in FIG. 3. Referring to FIG. 6, selector 230 includes a plurality of multiplexers, e.g., 232, 234, 236, each enabled by selection signals 218a, 218b, and amplitude portion 154b, respectively. Multiplexer 232 may receive reduced color burst phase error 228 and a null value 235 as inputs. When selection signal 218a indicates the phase portion 154a is corrupted, null value 235 is provided at an output of multiplexer 232, otherwise the reduced color burst phase error 228 is provided to the output of multiplexer 232.

Multiplexer 234 may receive the output of multiplexer 232 and phase portion 154a as inputs. When selection signal 218b is set to a high level, phase portion 154a is provided at an output of multiplexer 234, otherwise, when the selection signal 218b is set to a low level, the output of multiplexer 232 is provided to the output of multiplexer 234.

Multiplexer 236 may receive the output of multiplexer 234 and null value 235 as inputs. When amplitude portion 154b indicates the amplitude of the detected color burst is corrupted, null value 235 is provided to phase adjuster 240 as phase correction value 238, otherwise the output of multiplexer 234 is provided to phase adjuster 240 as phase correction value 238.

Figure 7:
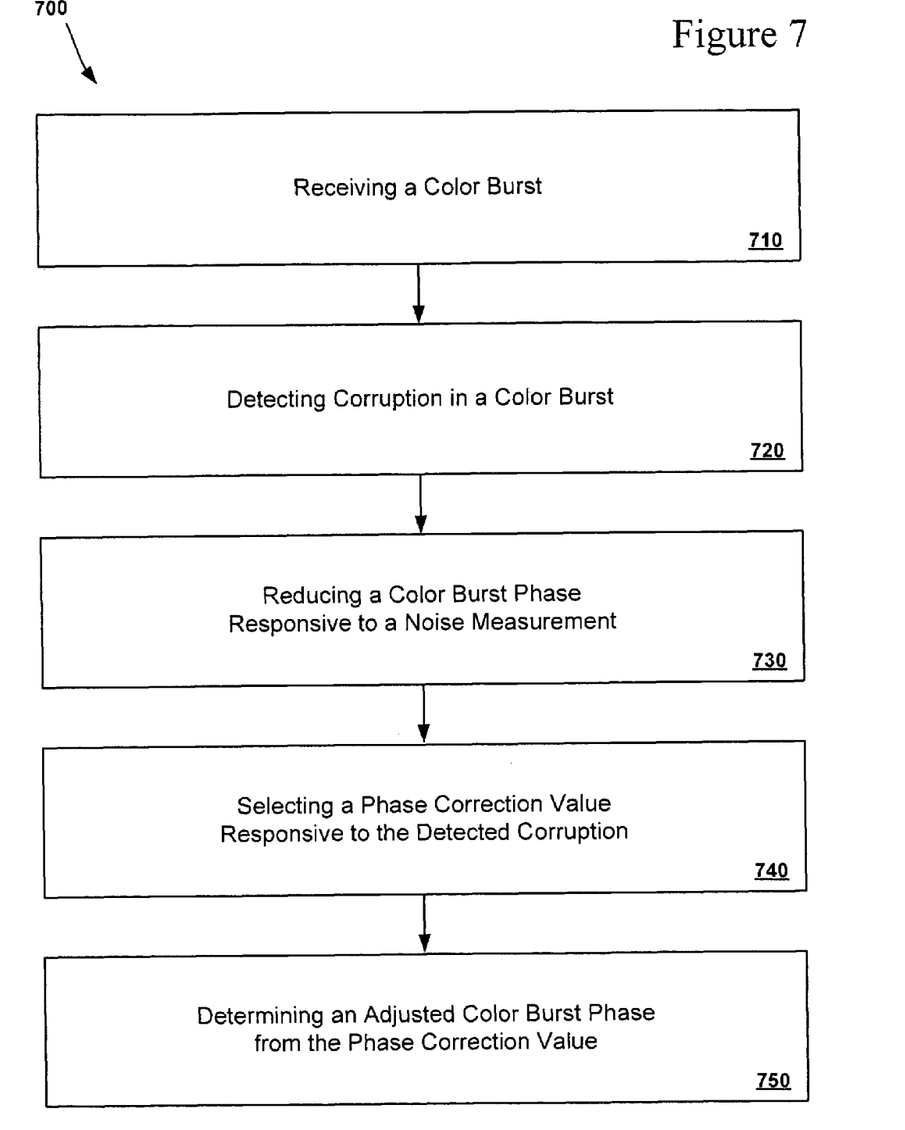
FIG. 7 is a flowchart of an embodiment of a method for determining a color burst phase.

FIG. 7 is a flowchart of an embodiment of a method for determining a color burst phase. Referring to FIG. 7, the adaptive phase corrector 200 receives a color burst at block 710. The adaptive phase corrector 200 may receive color burst measurements 154, e.g., amplitude, the phase, and the frequency of the color burst, or color burst error measurements of the amplitude, phase, and frequency with respect to expected color burst information, or the like. At block 720, the adaptive phase corrector 200 detects corruption in a color burst. In an embodiment, the adaptive phase corrector 200 may detect corruption by determining the average phase 213 responsive to phase portion 154a of the color burst measurement 154, and comparing the phase portion 154a with the average phase 213. At an optional block 730, the adaptive phase corrector 200 reduces the color burst phase 154a responsive to a noise measurement 153. The noise measurement 153 may be provided to the adaptive phase corrector 200 by the signal detector 152. The adaptive phase corrector 200 may reduce the color burst phase 154a when the color burst phase error is large. Although block 730 is shown as being performed subsequent to block 720, their order of operation may be concurrent, and in some instances reversed. At block 740, the adaptive phase corrector 200 selects a phase correction value 238 responsive to the detected corruption. The adaptive phase corrector 200 may select one of the color burst phase 154a, the reduced color burst phase error 228, and a null value 235. At a block 750, the adaptive phase corrector 200 determines an adjusted color burst phase 156 responsive to the phase correction value 238. In an embodiment, when the phase correction value 238 is a null value 235 the adjusted color burst phase 156 remains the same.

Having illustrated and described the principles of our invention, it should be readily apparent to those skilled in the art that the invention may be modified in arrangement and detail without departing from such principles. I claim all modifications coming within the spirit and scope of the accompanying claims.

I claim the following:

1. A system comprising:
   a signal detector to extract a color burst from a video signal, the color burst including a phase and an amplitude; and
   an adaptive phase corrector to adjust the color burst phase responsive to corruption in the color burst, where the adaptive phase corrector comprises a corruption detector to detect the corruption by determining an average phase responsive to the color burst phase and comparing the average phase to the color burst phase;
   a Y/C separator to separate luminance and chrominance data from the video signal, responsive to the adjusted color burst phase; and
   a panel to display the luminance and chrominance data.

2. The system of claim 1 where the adaptive phase corrector further comprises
   a selector to select a phase correction value responsive to the detected corruption; and
   a phase adjuster to adjust the color burst phase responsive to the phase correction value.

3. The system of claim 2 where the phase correction value is one of the color burst phase and a null value.

4. The system of claim 1
   where the signal detector determines a noise measurement from the video signal; and
   where the adaptive phase corrector includes a noise reducer to reduce the color burst phase responsive to the noise measurement.

5. The system of claim 4 where the phase correction value is one of the color burst phase, the reduced color burst phase, and a null value.

6. The system of claim 4 where the noise reducer comprises a reduction table populated with at least one reduction coefficient indexable by the noise measurement, each reduction coefficient capable of indicating a magnitude of the reduction in the phase color burst phase.

7. The system of claim 2
   where the corruption detector generates at least one phase corruption signal responsive to the detected corruption; and
   where the selector selects the phase correction value responsive to the phase corruption signal.

8. The system of claim 7 where the corruption detector generates the phase corruption signal responsive to the detected corruption and the color burst amplitude.

9. The system of claim 7 where the selector selects the phase correction value responsive to the phase corruption signal and the color burst amplitude.

10. An apparatus comprising:
    a corruption detector to detect corruption in a color burst phase of a color burst by comparing a phase error to a multiple of an average phase error, where the phase error comprises a difference in the color burst phase and an expected phase, and where the average phase error is determined from a plurality of previously received color bursts;
    a selector to select a phase correction value responsive to the detected corruption; and
    a phase adjuster to adjust the color burst phase responsive to the phase correction value.

11. The apparatus of claim 10 where the phase correction value is one of the color burst phase and a null value.

12. The apparatus of claim 10 where the includes phase adjuster comprises a noise reducer to reduce the color burst phase responsive to a noise measurement.

13. The apparatus of claim 12 where the phase correction value is one of the color burst phase, the reduced color burst phase, and a null value.

14. The apparatus of claim 10
    where the corruption detector generates at least one phase corruption signal responsive to the detected corruption; and
    where the selector selects the phase correction value responsive to the phase corruption signal.

15. The apparatus of claim 14 where the corruption detector generates the phase corruption signal responsive to the detected corruption and a color burst amplitude.

16. The apparatus of claim 14 where the selector selects the phase correction value responsive to the phase corruption signal and a color burst amplitude.

17. The apparatus of claim 12
    where the noise reducer reduces the phase error responsive to the noise measurement.

18. The apparatus of claim 17 where the selector selects the phase correction value between the phase error, the reduced phase error, and a null value.

19. The apparatus of claim 17 where the noise reducer comprises
    a reduction table populated with at least one reduction coefficient indexable by the noise measurement;
    an error reducer to determine an error coefficient responsive to the phase error; and
    a reducer to reduce the phase error responsive to the reduction coefficient and the error coefficient.

20. The apparatus of claim 19 where the reducer reduces the phase error by mathematically manipulating the phase error with the reduction coefficient and the error coefficient.

21. The apparatus of claim 10 where the corruption detector determines the phase error.

22. An apparatus comprising:
a corruption detection means to detect corruption means in a color burst phase means of a color burst means by comparing a phase error means to a multiple of an average phase error means from a plurality of previously received color burst means, where the phase error means comprises a difference in the color burst phase means and an expected phase means;
a selection means to select a phase correction means responsive to the detected corruption means; and
a phase adjusting means to adjust the color burst phase means responsive to the phase correction means.

23. The apparatus of claim 22 where the phase correction means is one of the color burst phase means and a null means.

24. The apparatus of claim 22 where the phase adjusting means comprises a noise reducing means to reduce the color burst phase means responsive to a noise means.

25. The apparatus of claim 24 where the phase correction means is one of the color burst phase means, the reduced color burst phase means, and a null means.

26. The apparatus of claim 22
where the corruption detection means generates at least one phase corruption signal means responsive to the detected corruption means; and
where the selection means selects the phase correction means responsive to the phase corruption signal means.

27. The apparatus of claim 26 where the corruption detection means generates the phase corruption signal means responsive to the detected corruption means and a color burst amplitude means.

28. The apparatus of claim 26 where the selection means selects the phase correction means responsive to the phase corruption signal means and a color burst amplitude means.

29. The apparatus of claim 24
where the noise reduction means reduces the phase error means responsive to the noise means.

30. The apparatus of claim 29 where the selection means selects the phase correction means between the phase error means, the reduced phase error means, and a null means.

31. The apparatus of claim 29 where the noise reduction means comprises
a reduction table means populated with at least one reduction coefficient means indexable by the noise means;
an error reduction means to determine an error coefficient means responsive to the phase error means; and
a reduction means to reduce the phase error means responsive to the reduction coefficient means and the error coefficient means.

32. The apparatus of claim 31 where the reduction means reduces the phase error means by mathematically manipulating the phase error means with the reduction coefficient means and the error coefficient means.

33. The apparatus of claim 22 where the corruption detection means determines the phase error means.

34. A method comprising:
detecting corruption in a color burst phase of a color burst by comparing a phase error to a multiple of an average phase error, where the phase error comprises a difference in the color burst phase and an expected phase, and where the average phase error is determined from previously received color bursts;
selecting a phase correction value responsive to the detected corruption; and
determining an adjusted color burst phase from the phase correction value.

35. The method of claim 34 where selecting the phase correction value includes selecting one of the color burst phase and a null value.

36. The method of claim 34 comprising reducing the color burst phase responsive to a noise measurement.

37. The method of claim 36 where selecting the phase correction value includes selecting one of the color burst phase, the reduced color burst phase, and a null value.

38. The method of claim 34 comprising generating at least one phase corruption signal responsive to the detected corruption, where selecting the phase correction value is responsive to the phase corruption signal.

39. The method of claim 38 where generating the phase corruption signal is responsive to the detected corruption and a color burst amplitude.

40. The method of claim 38 where selecting the phase correction value is responsive to the phase corruption signal and a color burst amplitude.

41. The method of claim 36 comprising
reducing the phase error responsive to the noise measurement.

42. The method of claim 41 where selecting the phase correction value includes selecting one of the phase error, the reduced phase error, and a null value.

43. The method of claim 41 where reducing the phase error includes
reducing the phase error responsive to a reduction coefficient and an error coefficient;
locating the reduction coefficient in an indexable reduction table using the noise measurement; and
determining the error coefficient responsive to the phase error.

44. The method of claim 43 where reducing the phase error comprises mathematically manipulating the phase error with the reduction coefficient and the error coefficient.

* * * * *

UNITED STATES PATENT AND TRADEMARK OFFICE
CERTIFICATE OF CORRECTION

PATENT NO. : 7,391,472 B1  Page 1 of 1
APPLICATION NO. : 11/031124
DATED : June 24, 2008
INVENTOR(S) : Neil D. Woodall It is certified that error appears in the above-identified patent and that said Letters Patent is hereby corrected as shown below:

Column 8, line 30, "the includes phase" should read "the phase"

Signed and Sealed this

Sixth Day of January, 2009

JON W. DUDAS
*Director of the United States Patent and Trademark Office*